United States Patent
MacFarlane et al.

(10) Patent No.: US 8,843,938 B2
(45) Date of Patent: Sep. 23, 2014

(54) METHODS, SYSTEMS, AND COMPUTER PROGRAM PRODUCTS FOR ASYNCHRONOUS RESUMPTION OF A DATAFLOW

(75) Inventors: Peter R. MacFarlane, Winchester (GB); Adrian W. Spender, Lucan (IE)

(73) Assignee: International Business Machines Corporation, Armonk, NY (US)

( * ) Notice: Subject to any disclaimer, the term of this patent is extended or adjusted under 35 U.S.C. 154(b) by 1386 days.

(21) Appl. No.: 12/166,499

(22) Filed: Jul. 2, 2008

(65) Prior Publication Data

US 2010/0005466 A1 Jan. 7, 2010

(51) Int. Cl.
| | |
|---|---|
| *G06F 9/46* | (2006.01) |
| *G06F 9/52* | (2006.01) |
| *G06F 9/50* | (2006.01) |
| *G06Q 10/10* | (2012.01) |
| *G06F 9/44* | (2006.01) |

(52) U.S. Cl.
CPC .............. *G06F 9/5038* (2013.01); *G06F 9/52* (2013.01); *G06Q 10/10* (2013.01); *G06F 8/34* (2013.01)
USPC ........................................................ 718/106

(58) Field of Classification Search
CPC .............................. G06F 9/5038; G06Q 10/10
See application file for complete search history.

(56) References Cited

U.S. PATENT DOCUMENTS

| | | | |
|---|---|---|---|
| 5,999,987 A | 12/1999 | O'Farrell et al. | |
| 8,584,004 B2 * | 11/2013 | Rae et al. ........................ | 715/219 |
| 2003/0014551 A1 * | 1/2003 | Ishibashi et al. .............. | 709/310 |
| 2005/0289505 A1 | 12/2005 | Williams | |
| 2009/0313600 A1 * | 12/2009 | Ayers et al. ................... | 717/106 |

OTHER PUBLICATIONS

Lonnie R. Welch, A Metrics-Driven Approach for Utilizing Concurrency in Object-Oriented Real-Time Systems, ACM SIGPLAN OOPS Messenger vol. 7 No. 1, Jan. 1996, pp. 70-77.
Yogesh L. Simmhan, et al., Karma2: Provenance Management for Data Driven Workflows. Extended and invited from ICWS 2006 with id 217, pp. 1-23.

* cited by examiner

*Primary Examiner* — Mengyao Zhe
(74) *Attorney, Agent, or Firm* — Cantor Colburn LLP; Ed Choi

(57) ABSTRACT

A method, system, and computer program product for providing asynchronous resumption of a dataflow are provided. The method includes building an executable directed graph from a dataflow that includes multiple interconnected nodes, where at least one of the interconnected nodes is an asynchronous node. The method further includes creating an event flow that includes the asynchronous node and interconnections subsequent to the asynchronous node. The method also includes invoking execution of the executable directed graph, and creating a state object with an identifier associated with the event flow in response to reaching the asynchronous node. The method additionally includes continuing execution of the executable directed graph while avoiding the asynchronous node and the interconnections subsequent to the asynchronous node, and resuming execution of the event flow as identified via the state object upon receiving a response for the asynchronous node.

20 Claims, 6 Drawing Sheets

METHODS, SYSTEMS, AND COMPUTER PROGRAM PRODUCTS FOR ASYNCHRONOUS RESUMPTION OF A DATAFLOW

BACKGROUND OF THE INVENTION

1. Field of Invention

The present invention relates generally to computer services management, and, in particular, to providing asynchronous resumption of a dataflow following a service invocation.

2. Description of Background

Service Oriented Architecture (SOA) is a development of distributed computing and modular programming in which existing or new technologies are grouped into atomic systems. SOAs use software services to build applications. Services are relatively large, intrinsically unassociated units of functionality with externalized service descriptions. In an SOA environment, one or more services communicate with one another by passing data from one service to another, or coordinating an activity between one or more services. In this manner, atomic services can be orchestrated into higher-level services. The architecture defines protocols that describe how services can talk to each other, and independent services can be accessed without knowledge of the underlying platform implementation.

Services are software applications designed to support interoperable machine-to-machine interactions over a network, such as the Internet, and can be executed on local or remote systems hosting the services. Services can provide an SOA implementation in which the basic unit of communication is a message, rather than an operation, by making functional building blocks accessible over standard Internet protocols that are independent from platforms and programming languages. Service requesters may use a variety of protocols and formatting when requesting services from service providers. An Enterprise Service Bus (ESB) can control traffic between the service requesters and providers. The ESB provides mediation of a service request to perform transformation, routing and other operations on a message before it is sent to a target recipient. For example, different protocols or message formats may be encountered when an airline reservation system issues a request for multiple airlines to provide flight information. Mediation can make the protocol and formatting differences appear seamless to the service requesters and providers. The series of mediation activities for a request dataflow or a response dataflow may be implemented in a directed graph of primitive operations. Typically, these operations are synchronous in nature.

In some circumstances it may be necessary to invoke an asynchronous primitive operation as part of the mediation, for example, by invoking an external service to perform the mediation. This is especially true when the original invocation was itself asynchronous or one-way. Mediation is typically performed in a container environment, such as a Java Platform, Enterprise Edition—Enterprise JavaBeans (Java EE EJB) container, which does not permit the creation of new threads and callbacks to handle asynchronous behavior. Existing solutions for container asynchronous behavior rely on higher-level mechanisms (e.g., coupling facility asynchronous beans) that do not fit well into a micro-flow style flow execution runtime environment used to perform mediation in an SOA. One approach to handling an asynchronous primitive operation is to chain multiple mediation flows together manually at design time. However, this approach is cumbersome and time consuming for designers. There are also greater expenses and risks associated with designing and maintaining multiple chained dataflows, as a design change in one dataflow may not be properly handled in the other chained dataflows. Chaining can also result in slower performance, as synchronous primitive operations are forced to wait for responses from asynchronous primitive operations before proceeding.

Therefore, it would be beneficial to develop an approach that enables an asynchronous primitive operation to be invoked as part of a directed graph dataflow, with resumption of the dataflow occurring at the correct point when the asynchronous primitive operation completes. Such an approach should allow the asynchronous primitive operation to be called within a common dataflow containing synchronous primitive operations, presenting a familiar and non-complex experience to the dataflow designer. Accordingly, there is a need in the art for providing asynchronous resumption of a dataflow following a service invocation.

BRIEF SUMMARY OF THE INVENTION

An exemplary embodiment is a method for providing asynchronous resumption of a dataflow. The method includes building an executable directed graph from a dataflow that includes multiple interconnected nodes, where at least one of the interconnected nodes is an asynchronous node. The method further includes creating an event flow that includes the asynchronous node and interconnections subsequent to the asynchronous node. The method also includes invoking execution of the executable directed graph, and creating a state object with an identifier associated with the event flow in response to reaching the asynchronous node. The method additionally includes continuing execution of the executable directed graph while avoiding the asynchronous node and the interconnections subsequent to the asynchronous node, and resuming execution of the event flow as identified via the state object upon receiving a response for the asynchronous node.

Another exemplary embodiment is a system for providing asynchronous resumption of a dataflow. The system includes a flow builder executing on a processing system, where the flow builder performs a method. The method includes building an executable directed graph from a dataflow comprising multiple interconnected nodes, wherein at least one of the interconnected nodes is an asynchronous node and creating an event flow including the asynchronous node and interconnections subsequent to the asynchronous node. The system also includes a flow engine executing on the processing system, where the flow engine performs a method. The method includes invoking execution of the executable directed graph, and creating a state object with an identifier associated with the event flow in response to reaching the asynchronous node. The method performed by the flow engine additionally includes continuing execution of the executable directed graph while avoiding the asynchronous node and the interconnections subsequent to the asynchronous node, and resuming execution of the event flow as identified via the state object upon receiving a response for the asynchronous node.

A further exemplary embodiment is a computer program product for providing asynchronous resumption of a dataflow. The computer program product includes a storage medium readable by a processing circuit and storing instructions for execution by the processing circuit for implementing a method. The method includes invoking execution of an executable directed graph of a dataflow including multiple interconnected nodes, where at least one of the interconnected nodes is an asynchronous node. The method further includes creating a state object with an identifier associated with an event flow in response to reaching the asynchronous node, where the event flow includes the asynchronous node and interconnections subsequent to the asynchronous node. The method additionally includes continuing execution of the executable directed graph while avoiding the asynchronous node and the interconnections subsequent to the asynchronous node, and resuming execution of the event flow as identified via the state object upon receiving a response for the asynchronous node.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as a preferred embodiment of the present invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments provide asynchronous resumption of a dataflow following a service invocation. An executable dataflow, such as a mediation flow implemented as a directed graph, is traversed during execution. In exemplary embodiments, a flow engine and a flow builder are adapted to handle an asynchronous primitive operation in an otherwise synchronous directed graph. The execution traversal of the graph can be paused with respect to the asynchronous primitive operation and then resumed at an arbitrary point without blocking execution of other synchronous primitive operations in the graph. This allows a dataflow designer to develop the flow without performing additional design steps of developing specific constructions to manage the invocation of the asynchronous primitive. The flow engine and flow builder can be implemented as part of a Service Oriented Architecture (SOA), to both ease design burdens and enhance performance while executing flows that include asynchronous primitive operations.

Figure 1:
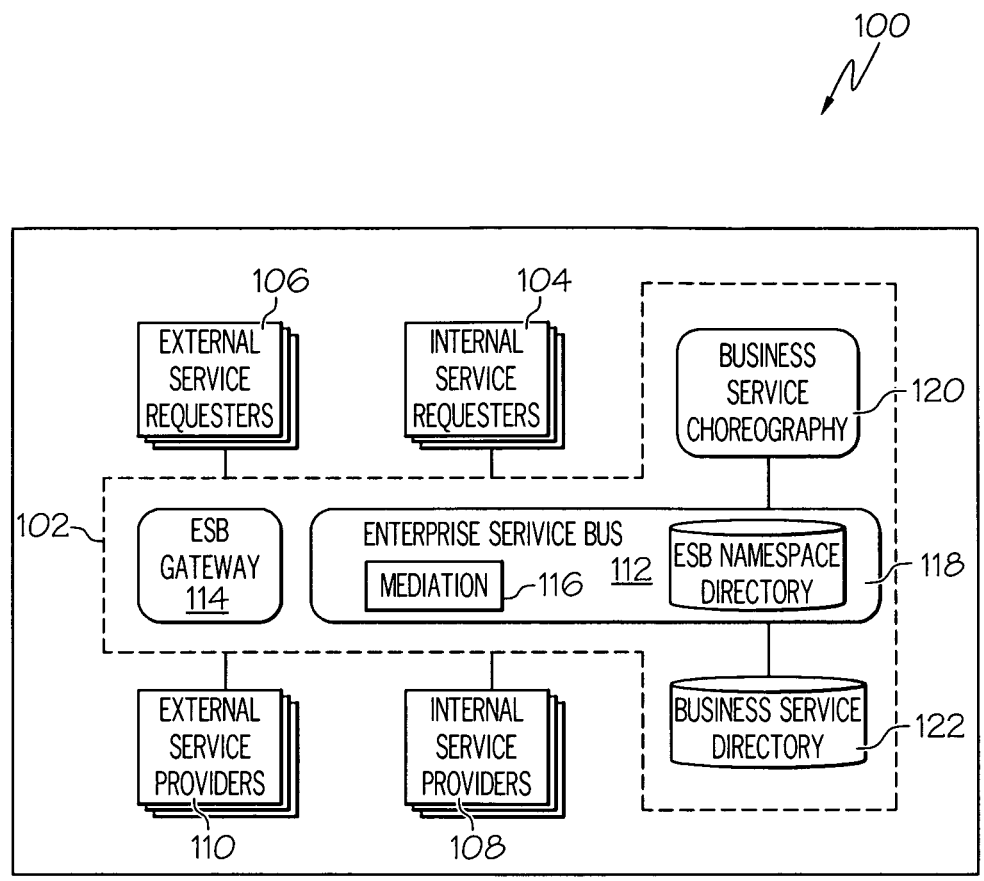
FIG. 1 depicts a system as part of a Service Oriented Architecture (SOA) in accordance with exemplary embodiments.

Turning now to the drawings, it will be seen that in FIG. 1 there is a block diagram of a system 100 upon which asynchronous resumption of a dataflow following a service invocation is implemented in exemplary embodiments. The system 100 of FIG. 1 includes an SOA infrastructure 102 that supports message delivery between a variety of internal service requesters 104 and external service requesters 106 to internal service providers 108 and external service providers 110. The internal service requesters 104 and internal service providers 108 can be local to an enterprise. An ESB 112 manages the flow of messages between the service requesters 104 and 106 and the service providers 108 and 110 via an ESB gateway 114. The ESB gateway 114 may provide basic security and static routing features, while the ESB 112 provides advanced features to facilitate intelligent message handling and advanced connectivity options. The ESB 112 provides services to resolve differences in protocol and format, and decouples the service requesters 104 and 106 from the service providers 108 and 110. The capabilities provided by the ESB 112 may include, for example, invocation, routing, mediation, messaging, mediation, messaging, process choreography, service orchestration, complex event processing, and management functions. The ESB 112 serves as a centralized broker that handles issues relating to security, access, and communication in the SOA infrastructure 102. In one particular exemplary capability, the ESB 112 serves as a message mediator by receiving, processing, and passing request messages from the service requesters 104 and 106 and response messages from the service providers 108 and 110 such that the services can be called to perform tasks in a standard way, without the providers having foreknowledge of the requesters, and without the requesters having or needing knowledge of how the providers actually perform the tasks. The message processing performed by the ESB 112 may be built upon generally accepted web services standards and protocols such as, for example, XML (a markup language for describing data in message payloads in a document format), HTTP (or HTTPS, a request/response protocol between clients and servers used to transfer or convey information), SOAP (a protocol for exchanging XML-based messages over a computer network, normally using HTTP), and XACML (a markup language for expressing access control rules and policies). The ESB 112 can be implemented on one or more host processing systems that include a processing circuit and a computer-readable storage medium storing instructions for execution by the processing circuit (e.g., mainframe, server, personal computer or a combination thereof).

A mediation function 116 can interpret mediation dataflows as executable directed graphs to determine how to process and direct messages. Operations performed by the mediation function 116 can include identifying specific internal or external service providers for routing messages, as well as other functions, such as logging messages, filtering messages, invoking operations, and transforming messages and responses. The mediation function 116 may invoke both local and remote services to mediate messages. An ESB namespace directory 118 is used to map names to their respective endpoints in directing message traffic. Business service choreography 120 provides rules for development and execution of business process flow logic, which is abstracted from business applications. The business service choreography 120 may govern the sequencing and control of service invocations, which in turn support the business processes and workflows. Business service directory 122 provides details of services that are available to perform business functions identified within a taxonomy. The business service directory 122 can be implemented as an open-standard UDDI registry to publish the availability of services.

Figure 2:
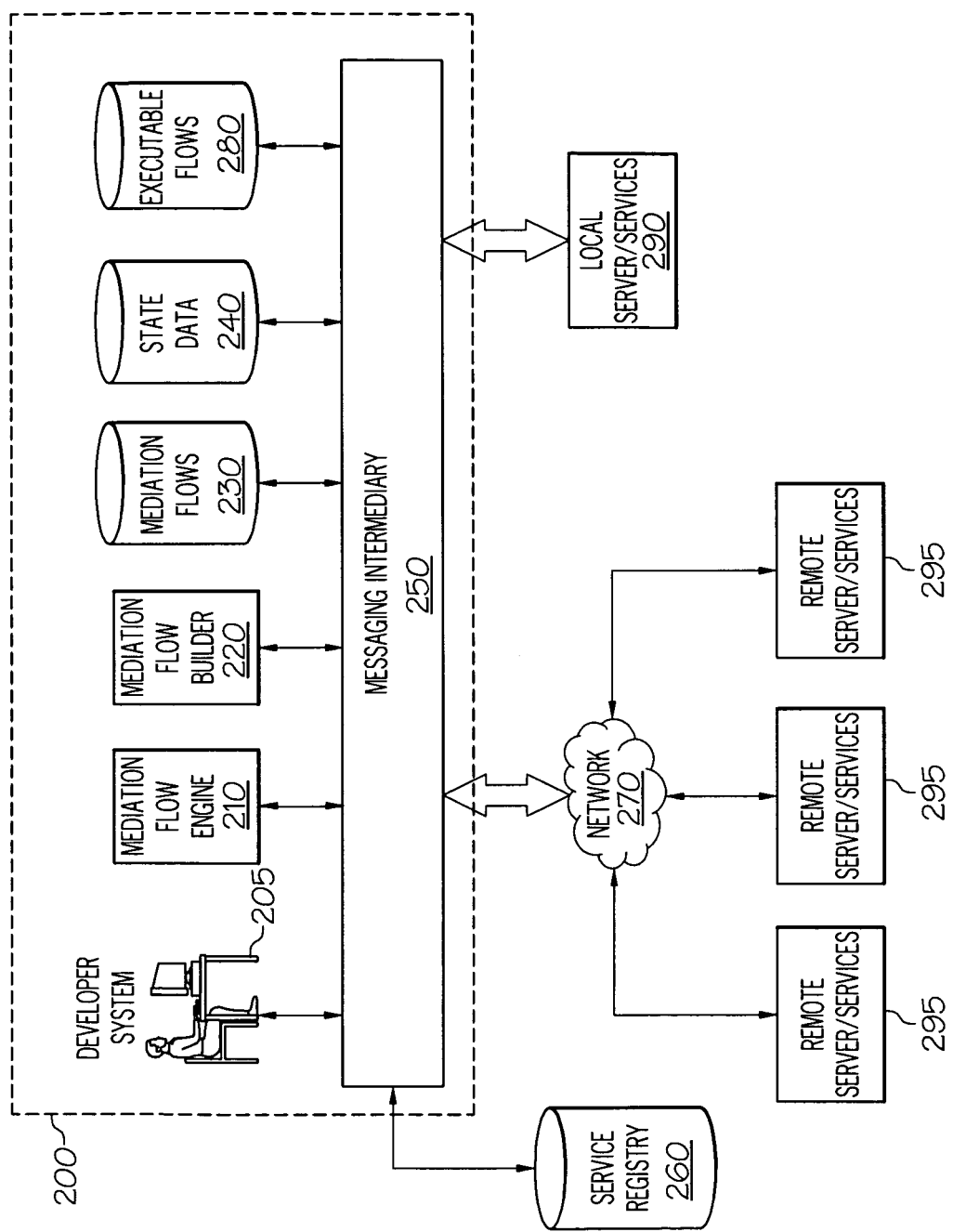
FIG. 2 depicts an example of a system providing asynchronous resumption of a dataflow following a service invocation in accordance with exemplary embodiments.

FIG. 2 depicts an example of a system providing asynchronous resumption of a dataflow following a service invocation in accordance with exemplary embodiments. Mediation function 200 provides message mediation between local server/services 290 and remote server/services 295, and may be part of an ESB, such as the mediation function 116 of ESB 112 of FIG. 1. The local server/services 290 and remote server/services 295 may be service requesters or service providers running on application servers or web servers, for instance, the service requesters 104 and 106 and the service providers 108 and 110 of FIG. 1.

The mediation function 200 is configured to transform message formats between service requesters and providers, route requests to the correct service providers, and convert transport protocols between the service requesters and providers. For example, if a service provider expects encrypted messages, the mediation function 200 can include such capability in request messages sent to that provider. The mediation function 200 can be configured to provide virtualization of applications according to rules and specifications of the SOA, allowing the logic of those applications to be developed and managed independently of the infrastructure, network, and other provisions of the services specified in the SOA. In this manner, the mediation function 200 can help promote loose coupling between service requesters and service providers.

A developer using a developer system 205 can design mediation flows 230 that perform request and response processing of messages between the local server/services 290 and remote server/services 295. Each flow in the mediation flows 230 can include both synchronous and asynchronous primitive operations without requiring the developer to design additional flows to handle asynchronous responses. The mediation flows 230 can be stored in a computer readable storage medium for further processing. Mediation flow builder 220 reads the mediation flows and produces executable flows 280 as directed graphs of executable components. In exemplary embodiments, the mediation flow builder 220 builds an executable graph by recursively following connections between nodes as defined in the flow definition. The resulting executable graph is uniquely identified and stored in the executable flows 280. In response to encountering an asynchronous node, the mediation flow builder 220 creates a new executable flow with the asynchronous node as the initial node and further including connection paths subsequent to the asynchronous node. This flow is uniquely named, identified as being an event flow, and stored in the executable flows 280. The designer of the original flow may be unaware of the newly created event flow, as no additional design effort is required of the designer to produce the event flow. The executable flows 280 may be stored in a volatile or non-volatile computer readable storage medium as generated by the mediation flow builder 220.

In exemplary embodiments, a mediation flow engine 210 invokes executable flows 280 to mediate messages received via messaging intermediary 250. The messaging intermediary 250, which may comprise a communications middleware component supporting a variety of communications paradigms, APIs, platforms, and standard protocols, receives a request message from an invoking application, processes the message in accordance with specified business rules and provisions, determines the location of the requested service provider (for example, by accessing service registry 260), and sends the message to the appropriate service provider. The messaging intermediary 250 can be configured based upon standards such as XML, SOAP, UDDI, and WSDL. Upon receiving the request message, the mediation flow engine 210 performs the processing for the requested services using the executable flows 280, and returns a response message describing any return values of the processing to message intermediary 250, which in turn returns the response message to the invoking application.

The message intermediary 250 and the remote server/services 295 communicate with each other through network 270. The network 270 is configured to receive and pass request and response messages, and to use the transportation protocol or protocols used by messages. The network 270 may include intranets, extranets, and the Internet, and can contain any number of network infrastructure elements including routers, switches, gateways, etc. For example, the network 270 may be the Internet or a private LAN.

The mediation flow engine 210 uses message data to uniquely identify which of the executable flows 280 to execute. When the mediation flow engine 210 encounters an asynchronous node, a state object is created which contains the unique identifier of an associated event flow and a correlator, which allows the state object to be retrieved when an asynchronous response is received. The state object may be stored in a volatile or non-volatile computer readable storage medium as state data 240. The mediation flow engine 210 continues with execution of the original flow. When the asynchronous response from the asynchronous node is received, the mediation flow engine 210 retrieves the associated state object from the state data 240 and inspects it to find the unique identifier of the event flow. The mediation flow engine 210 executes the event flow, which may be on a separate thread of execution while the original flow is still under execution. Thus, creating and executing an event flow prevents the original flow from stalling while waiting for an asynchronous node to complete.

Figure 3:
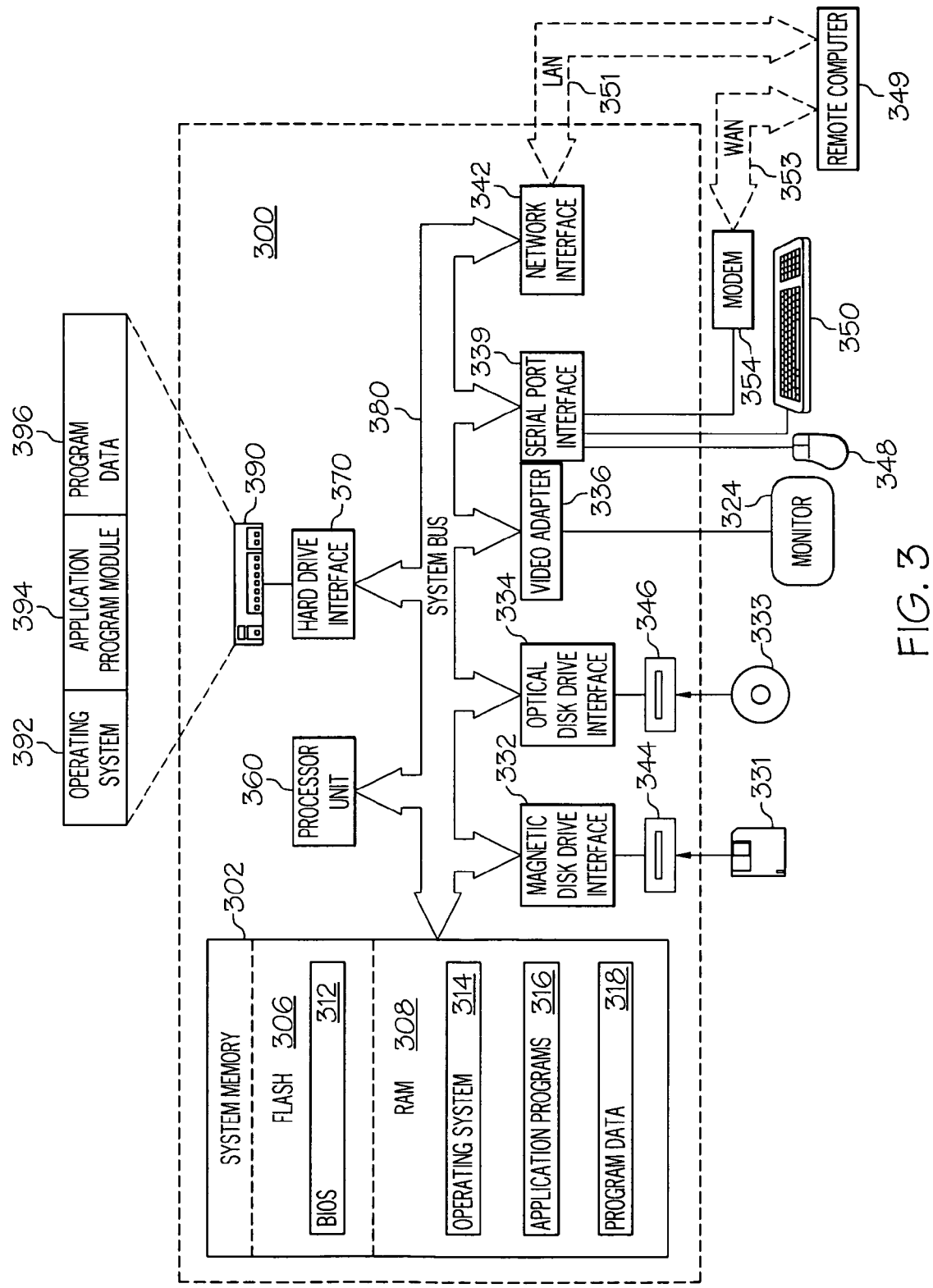
FIG. 3 depicts a block diagram illustrating an exemplary computer system that may be utilized to implement exemplary embodiments of the present invention.

Referring now to FIG. 3, an exemplary processing system 300 is depicted that may be utilized to implement exemplary embodiments of the present invention. For discussion purposes, the processing system is described as having features common to a personal computer, such as a desktop or portable computer. As used herein, however, the terms "processing system," "computer," and the like are intended to mean essentially any type of computing device or machine that is capable of receiving, storing, and running a software product, including such devices as communication devices (for example, pagers, telephones, electronic books, electronic magazines and newspapers, etc.) and personal and home consumer devices (for example, handheld computers, web-enabled televisions, home automation systems, multimedia viewing systems, gaming consoles, etc.).

Processing system 300, as provided in FIG. 3, is configured as a personal computer that generally includes a processing unit 360, a system memory 302, and a system bus 380 that couples system memory 302 to processing unit 360. The system memory 302 includes flash memory 306 and random access memory (RAM) 308. Flash memory 306 is an electrically erasable programmable read only memory (EEPROM) module that includes a basic input/output system (BIOS) 312. BIOS 312 contains the basic routines that facilitate transfer of information between elements within personal computer 300, such as during start-up.

Processing system 300 further includes a hard disk drive 390, a magnetic disk drive 344 (which can be used to read from or write to a removable disk 331), and an optical disk drive 346 (which can be used to read a CD-ROM disk 333 or read or write to other optical media). Hard disk drive 390, magnetic disk drive 344, and optical disk drive 336 are electrically communicatively coupled to system bus 380 by a hard disk drive interface 370, a magnetic disk drive interface 332, and an optical drive interface 334, respectively. The drives and their associated computer-readable media provide nonvolatile storage for processing system 300. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments.

A number of program modules may be stored in the drives and RAM 308, including an operating system 314, application program modules 316 (such as, for example, word processors and design applications), and program data 318. A user may enter commands and information into processing system 300 through a keyboard 350 and a mouse 348. Other input devices (not shown) may include, for example, a microphone, joystick, game pad, satellite dish, scanner, or the like. These and other input devices are often connected to processing unit 360 through a serial port interface 339 that is coupled to system bus 380, but may be connected by other interfaces, such as a game port or a universal serial bus (USB). A monitor 324 or other type of display device is also connected to system bus 380 via an interface, such as a video adapter 336. In addition to the monitor, the exemplary computer operating environment may also include other peripheral output devices (not shown), such as speakers or printers.

Processing system 300 may operate in a networked environment using logical connections to one or more remote computers, such as a remote computer 349. Remote computer 349 may be, for example, a server, a router, a peer device, or another common network node, and may include many or all of the elements described in relation to processing system 300. The logical connections depicted in FIG. 3 include a local area network (LAN) 351 and a wide area network (WAN) 353.

When used in a LAN networking environment, processing system 300 is connected to LAN 351 through a network interface 342. When used in a WAN networking environment, processing system 300 includes a modem 354 or other means for establishing communications over WAN 353, such as the Internet. Modem 354, which may be internal or external to processing system 300, is connected to system bus 380 via serial port interface 339. In a networked environment, program modules depicted relative to processing system 300, or portions thereof, may be stored in the remote memory storage device. It will be appreciated that the network connections shown are exemplary and other means of establishing a communications link between the computers may be used.

Exemplary embodiments of the present invention may be implemented in conjunction with an SOA environment such as, for example, an integrated web services implementation, in which the SOA supports integration and consolidation of any number of services and processes. Web services are self-contained, self-describing, modular applications that may be described, located, and invoked over a computer network such as the World Wide Web. Web services utilize standardized interfaces and protocols (for example, a web Application Programming Interface (API)) to implement consolidation and integration methods that allow different entities or web-based applications to communicate data, logic, and processes with one another over a network. These standardized methods permit different applications to exchange resources with other entities or applications that are running on different operating systems. In an SOA environment, the SOA may define a interface through which a service-requesting or client-side party may access web services or enterprise-based services provided within an enterprise domain, specify or consolidate a set of web services or web service providers that may be invoked through the interface, and define protocols for communicating with the set of web services through the SOA interface.

Figure 4:
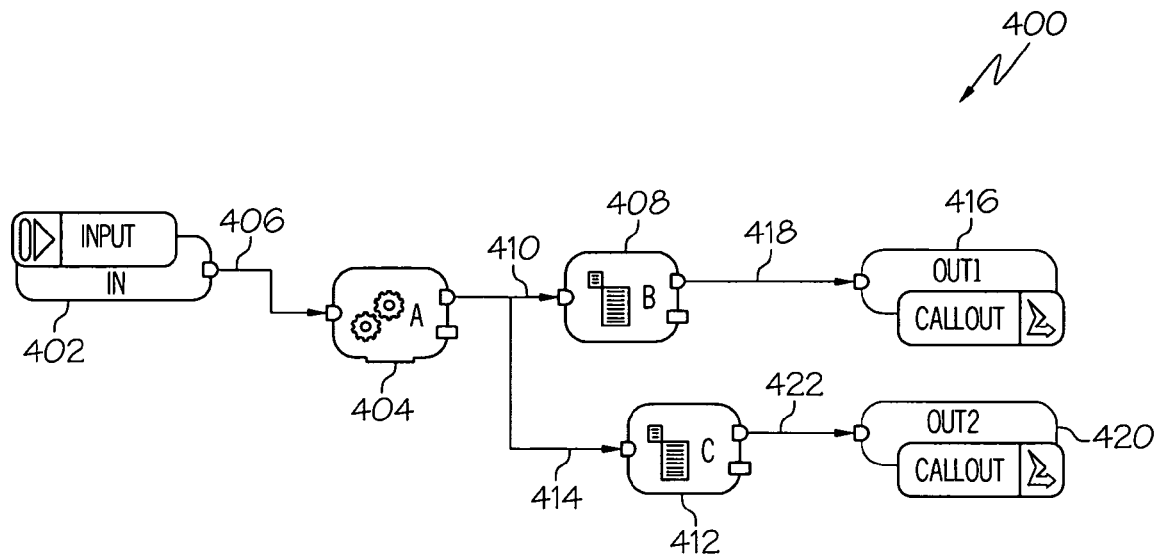
FIG. 4 depicts an example of a dataflow in accordance with exemplary embodiments.

Turning now to FIG. 4, an example of a dataflow 400 is depicted in accordance with exemplary embodiments. The dataflow 400 can be a mediation dataflow created by a developer via the developer system 205 of FIG. 2 and stored in the mediation flows 230. The dataflow 400 represents a simple example of a dataflow that can be parsed by the mediation flow builder 220 of FIG. 2. Input node 402 handles receiving an input message, which is passed to node A 404 for further processing via wire 406. Node A 404 may be a mediation primitive that parses the input message from the input node 402 and invokes nodes B 408 and C 412. Wire 410 provides an interface between node A 404 and node B 408, while wire 414 provides an interface between node A 404 and node C 412. Node B 408 can send an output message to output1 node 416 via wire 418. Node C 412 can send a separate output message to output2 node 420 via wire 422. In the example dataflow 400, node B 408 can be an asynchronous node, while nodes A 404 and C 412 are synchronous nodes. In the exemplary embodiment of FIG. 4, the developer of the dataflow 400 need not perform anything specific to handle the asynchronous actions of node B 408.

Figure 5:
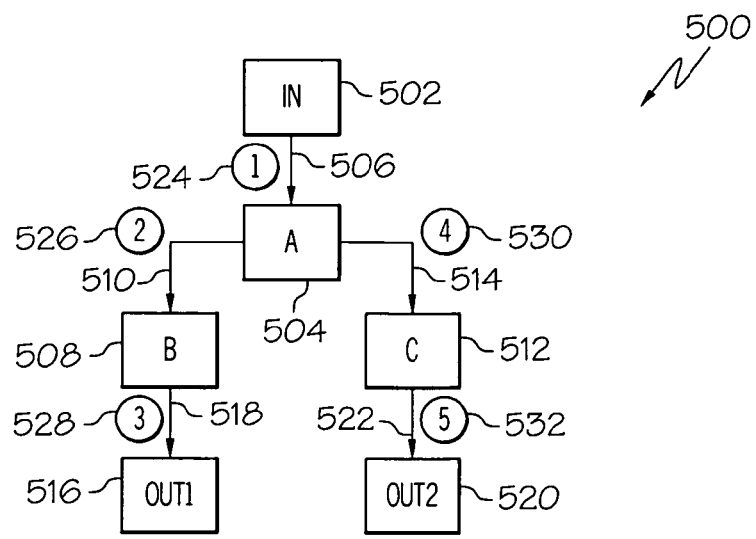
FIG. 5 depicts an example of a directed graph of executable components corresponding to the dataflow of FIG. 4 in accordance with exemplary embodiments.

The mediation flow builder 220 of FIG. 2 can be used to create a runtime execution version of the dataflow 400 of FIG. 4 as directed graph 500 of FIG. 5. The nodes and wires of the dataflow 400 are converted into executable components of nodes and connections of the directed graph 500. For example, the input node 402 maps to In node 502, node A 404 maps to node A 504, wire 406 maps to connection 506, node B 408 maps to node B 508, wire 410 maps to connection 510, node C 412 maps to node C 512, wire 414 maps to connection 514, output1 node 416 maps to out1 node 516, wire 418 maps to connection 518, output2 node 420 maps to out2 node 520, and wire 422 maps to connection 522. The directed graph 500 can be stored in the executable flows 280 of FIG. 2.

Figure 6:
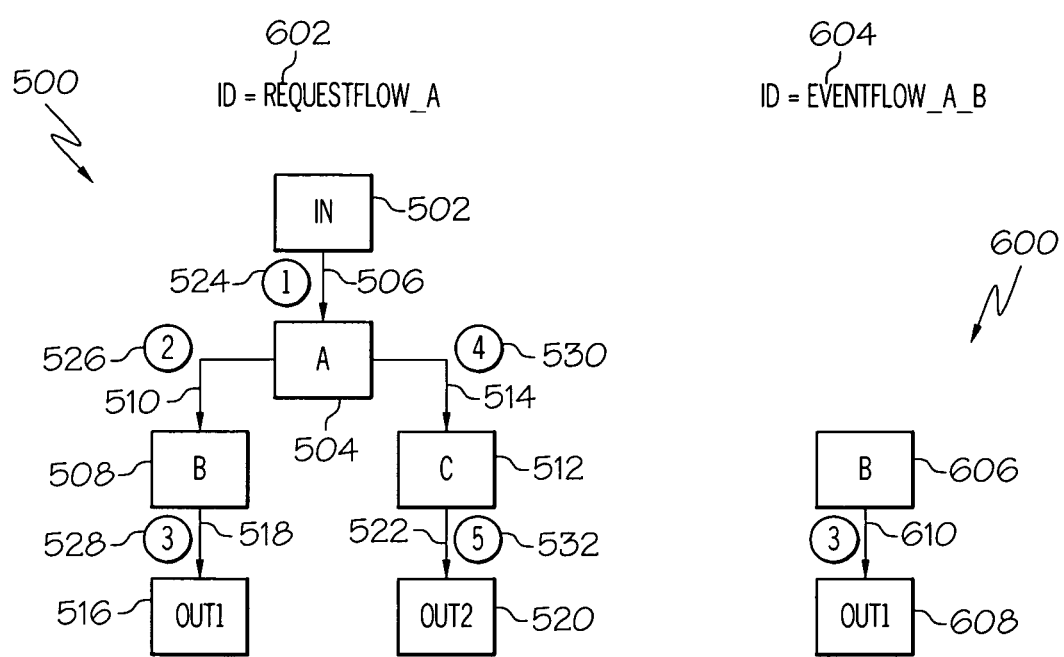
FIG. 6 depicts an example of a new directed graph of executable components created from the directed graph of FIG. 5 in accordance with exemplary embodiments.

The mediation flow engine 210 may execute the directed graph 500 when a message is received for a service associated with the dataflow 400 of FIG. 4. The mediation flow engine 210 executes the directed graph 500 in a recursive manner, branching down each tree in the graph in turn. Bubbles 524, 526, 528, 530 and 532 indicate the expected invocation order (1-5) for performing work in each of the nodes 504, 508, 512, 516, and 520 upon performing the work of In node 502. If all of the nodes 502-520 were synchronous, then the operations of each of the nodes 502-520 would be completed in the order indicated in the bubbles 524-532 before advancing to the next node. Without the inventive principles as described herein, the execution of the nodes 512 and 520 and connections 514 and 522 would be blocked until the asynchronous operations of node B 508 completed. In exemplary embodiments, the mediation flow builder 220 of FIG. 2 creates an event flow 600 as depicted in FIG. 6 to prevent the loss of performance associated with busy waiting for node B 508 to complete. The event flow 600 includes a copy of the node B 508 and subsequent interconnections. For example, node B 508 is copied as node B 606, out1 node 516 is copied as out1 node 608, and connection 518 is copied as connection 610. Bubble 612 indicates that the expected order of invocation of connection 610 is the same as the expected order of invocation of connection 518, as out1 node 608 may rely on state data 240 as it existed in an earlier invoked node or connection, but not as modified by a later invoked node or connection (i.e., nodes 512 and 520 and connections 530 and 532).

The asynchronous operation carried out by node B 508 does not result in the blocking of the execution of the directed graph 500, instead it allows nodes 512 and 520 and connections 530 and 532 to be executed as soon as the asynchronous invocation of node B 508 has been made. The invocation of the out1 node 516 is made when the asynchronous processing of node B 508 has completed.

The mediation flow engine 210 can assign unique identifiers to each flow object, such as setting ID 602 to "RequestFlow_A" for the directed graph 500 and ID 604 to "EventFlow_A_B" for event flow 600. The IDs 602 and 604 can be stored in state objects in the state data 240. Upon receiving a response message via the messaging intermediary 250, the mediation flow engine 210 can identify which flow to execute. A response from the asynchronous node B 508 can trigger the mediation flow engine 210 to retrieve the state object from the state data 240 and analyze it to locate the ID 604. The event flow 600 is then executed to perform nodes B 606 and Out1 608 as interconnected via connector 610. The event flow 600 can be invoked on a separate thread from the directed graph 500 in response to determining that the directed graph 500 is executing.

Figure 7:
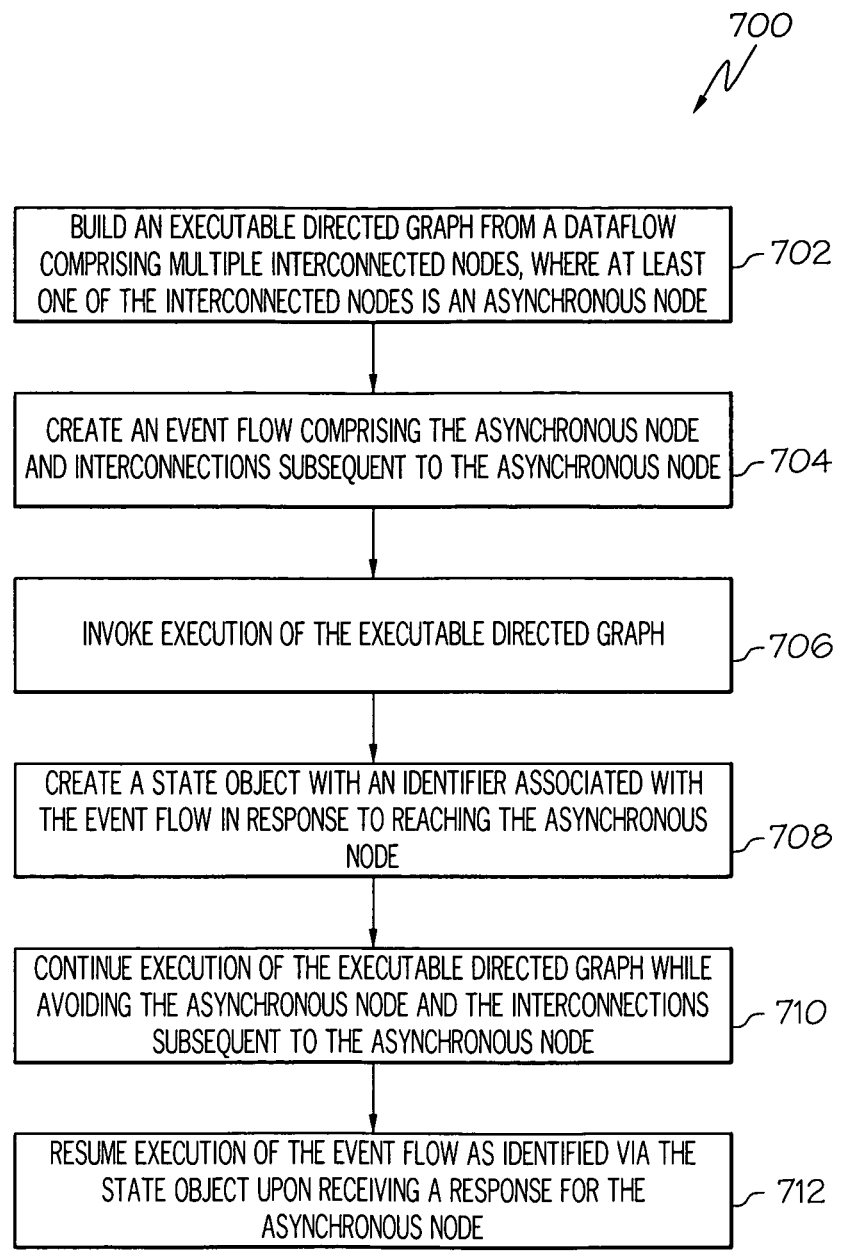
FIG. 7 depicts an exemplary process for providing asynchronous resumption of a dataflow following a service invocation in accordance with exemplary embodiments.

Turning now to FIG. 7, a process 700 for asynchronous resumption of a dataflow will now be described in accordance with exemplary embodiments, and in reference to FIGS. 1-6. At block 702, mediation flow builder 220 builds executable directed graph 500 from dataflow 400 that includes multiple interconnected nodes, where at least one of the interconnected nodes is an asynchronous node, such as that depicted in FIGS. 4 and 5. The dataflow 400 can include both synchronous and asynchronous nodes, with asynchronous nodes relying upon external data that can be delayed (e.g., a response message), while synchronous nodes can be performed without waiting. For example, nodes 504 and 512 can be synchronous, while node 508 is asynchronous. At block 704, the mediation flow builder 220 creates event flow 600 that includes the asynchronous node and interconnections subsequent to the asynchronous node, such as that depicted in FIG. 6.

At block 706, the mediation flow engine 210 invokes execution of the executable directed graph 500. Invocation of the executable directed graph 500 may be in response to receiving a message via the ESB 112 of FIG. 1. At block 708, the mediation flow engine 210 creates a state object with an identifier 604 associated with the event flow 600 in response to reaching the asynchronous node 508. The state object can be stored in state data 240 and may include a copies of data to preserve state information in case the state information is changed by continued execution of the executable directed graph 500.

At block 710, the mediation flow engine 210 continues execution of the executable directed graph 500 while avoiding the asynchronous node 508 and the interconnections 518 and 516 subsequent to the asynchronous node 508. Thus, synchronous nodes 512 and 520 can execute without waiting for nodes 508 and 516 to complete execution. At block 712, the mediation flow engine 210 resumes execution of the event flow 600 as identified via the state object upon receiving a response for the asynchronous node 508. The invocation of the event flow 600 can occur while the executable directed graph 500 is still executing or after it completes.

Technical effects and benefits of exemplary embodiments include creating an event flow from a dataflow containing an asynchronous node. Multiple event flows can be created from a single dataflow, where each event flow corresponds to an asynchronous node and subsequent interconnections including additional nodes. The event flows can be created and stored without a flow designer making explicit changes to the dataflow or making other high level flows to handle mixing of asynchronous and synchronous primitive operations. An asynchronous node is handled at runtime by capturing state data in a state object along with a unique identifier for the associated event flow, allowing execution of nodes that are not included in the event flow to proceed without waiting for the event flow to receive an asynchronous response.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing asynchronous resumption of a dataflow, comprising:
   building an executable directed graph from a dataflow comprising multiple interconnected nodes, wherein at least one of the interconnected nodes is an asynchronous node, wherein at least one synchronous node is dependent upon execution of the asynchronous node and wherein at least one synchronous node is subsequent to and not dependent upon the asynchronous node;
   creating an event flow from the executable directed graph, the event flow comprising the asynchronous node and interconnections subsequent to the asynchronous node including the at least one synchronous node dependent upon execution of the asynchronous node;
   invoking execution of the executable directed graph;

creating a state object with an identifier associated with the event flow in response to reaching the asynchronous node;

continuing execution of the executable directed graph while avoiding the asynchronous node and the interconnections subsequent to and dependent upon the asynchronous node, wherein continuing execution of the executable directed graph includes executing the at least one synchronous node is subsequent to and not dependent upon the asynchronous node; and resuming execution of the event flow as identified via the state object upon receiving a response for the asynchronous node.

2. The method of claim 1 wherein resuming execution of the event flow further comprises:

analyzing the state object to locate the identifier; and invoking the event flow in response to locating the identifier.

3. The method of claim 2 wherein the event flow is invoked on a separate thread from the executable directed graph in response to determining that the executable directed graph is executing.

4. The method of claim 1 further comprising:

storing the executable directed graph and the event flow to a non-volatile computer-readable storage medium; and storing the state object to a volatile computer-readable storage medium.

5. The method of claim 1 wherein the dataflow is a mediation dataflow to handle one of a service request and a service response in an enterprise system bus (ESB) of a service oriented architecture (SOA).

6. The method of claim 5 wherein invoking execution of the executable directed graph is performed in response to receiving a message via the ESB.

7. The method of claim 1 wherein at least one of the interconnected nodes is a synchronous node that is executed upon continuing execution of the executable directed graph while avoiding the asynchronous node and the interconnections subsequent to the asynchronous node.

8. A system for providing asynchronous resumption of a dataflow, comprising:

a flow builder executing on a processing system including a non-transitory computer readable storage medium, wherein the flow builder performs a method comprising:

building an executable directed graph from a dataflow comprising multiple interconnected nodes, wherein at least one of the interconnected nodes is an asynchronous node, wherein at least one synchronous node is dependent upon execution of the asynchronous node and wherein at least one synchronous node is subsequent to and not dependent upon the asynchronous node; and creating an event flow from the executable directed graph, the event flow comprising the asynchronous node and interconnections subsequent to the asynchronous node including the at least one synchronous node dependent upon execution of the asynchronous node; and a flow engine executing on the processing system, wherein the flow engine performs a method comprising:

invoking execution of the executable directed graph;

creating a state object with an identifier associated with the event flow in response to reaching the asynchronous node;

continuing execution of the executable directed graph while avoiding the asynchronous node and the interconnections subsequent to and dependent upon the asynchronous node, wherein continuing execution of the executable directed graph includes executing the at least one synchronous node is subsequent to and not dependent upon the asynchronous node; and resuming execution of the event flow as identified via the state object upon receiving a response for the asynchronous node.

9. The system of claim 8 wherein resuming execution of the event flow further comprises:

analyzing the state object to locate the identifier; and invoking the event flow in response to locating the identifier.

10. The system of claim 9 wherein the event flow is invoked on a separate thread from the executable directed graph in response to determining that the executable directed graph is executing.

11. The system of claim 8 wherein the flow builder stores the executable directed graph and the event flow to a non-volatile computer-readable storage medium, and the flow engine stores the state object to a volatile computer-readable storage medium.

12. The system of claim 8 wherein the dataflow is a mediation dataflow to handle one of a service request and a service response in an enterprise system bus (ESB) of a service oriented architecture (SOA).

13. The system of claim 12 wherein invoking execution of the executable directed graph is performed in response to receiving a message via the ESB.

14. The system of claim 9 wherein at least one of the interconnected nodes is a synchronous node that is executed upon continuing execution of the executable directed graph while avoiding the asynchronous node and the interconnections subsequent to the asynchronous node.

15. A computer program product for providing asynchronous resumption of a dataflow, the computer program product comprising:

a non-transitory storage medium readable by a processing circuit and storing instructions for execution by the processing circuit for implementing a method, the method comprising:

invoking execution of an executable directed graph of a dataflow comprising multiple interconnected nodes, wherein at least one of the interconnected nodes is an asynchronous node, wherein at least one synchronous node is dependent upon execution of the asynchronous node and wherein at least one synchronous node is subsequent to and not dependent upon the asynchronous node;

creating a state object with an identifier associated with an event flow in response to reaching the asynchronous node, wherein the event flow comprises the asynchronous node and interconnections subsequent to the asynchronous node including the at least one synchronous node dependent upon execution of the asynchronous node;

continuing execution of the executable directed graph while avoiding the asynchronous node and the interconnections subsequent to and dependent upon the asynchronous node, wherein continuing execution of the executable directed graph includes executing the at least one synchronous node is subsequent to and not dependent upon the asynchronous node; and resuming execution of the event flow as identified via the state object upon receiving a response for the asynchronous node.

16. The computer program product of claim 15 wherein resuming execution of the event flow further comprises:

analyzing the state object to locate the identifier; and invoking the event flow in response to locating the identifier.

17. The computer program product of claim 16 wherein the event flow is invoked on a separate thread from the executable directed graph in response to determining that the executable directed graph is executing.

18. The computer program product of claim 15 wherein the state object is stored to a volatile computer-readable storage medium.

19. The computer program product of claim 15 wherein the dataflow is a mediation dataflow to handle one of a service request and a service response in an enterprise system bus (ESB) of a service oriented architecture (SOA), and invoking execution of the executable directed graph is performed in response to receiving a message via the ESB.

20. The computer program product of claim 15 wherein at least one of the interconnected nodes is a synchronous node that is executed upon continuing execution of the executable directed graph while avoiding the asynchronous node and the interconnections subsequent to the asynchronous node.

* * * * *